United States Patent [19]
Lee et al.

[11] Patent Number: 6,128,804
[45] Date of Patent: Oct. 10, 2000

[54] VACUUM SYSTEM FOR A MOTOR VEHICLE

[76] Inventors: Brian Lee; Jackie Lee, both of 1864 Skyline Dr., Honolulu, Hi. 96817

[21] Appl. No.: 08/940,884

[22] Filed: Sep. 30, 1997

[51] Int. Cl.[7] .................................................... A47L 15/00
[52] U.S. Cl. ................................................................ 15/313
[58] Field of Search ................................................ 15/313

[56] References Cited

U.S. PATENT DOCUMENTS

| | | |
|---|---|---|
| 3,230,567 | 1/1966 | Nickless ...................................... 15/313 |
| 3,449,787 | 6/1969 | Rothstein et al. . |
| 3,998,385 | 12/1976 | Ogle . |
| 4,072,097 | 2/1978 | Seibel . |
| 4,453,286 | 6/1984 | Wieland . |

*Primary Examiner*—David A. Redding
*Attorney, Agent, or Firm*—Michael I. Kroll

[57] ABSTRACT

A vacuum system (14) for a motor vehicle (16) comprising a litter box (18) mounted in any convenient location within an interior compartment (20) of the motor vehicle (16). A vacuum canister (22) is provided that holds trash in disposable vacuum bags to be disposed at a later date. A facility (24) is for electrically connecting the vacuum canister (22) to a battery (26) in the motor vehicle (16), to operate the vacuum canister (22). A component (28) is for fluidly coupling the vacuum canister (22) to the litter box (18), so that any litter deposited within the litter box (18) will be drawn through the fluidly coupling component (28) and deposited into the vacuum canister (22) to be disposed of at a later date.

8 Claims, 6 Drawing Sheets

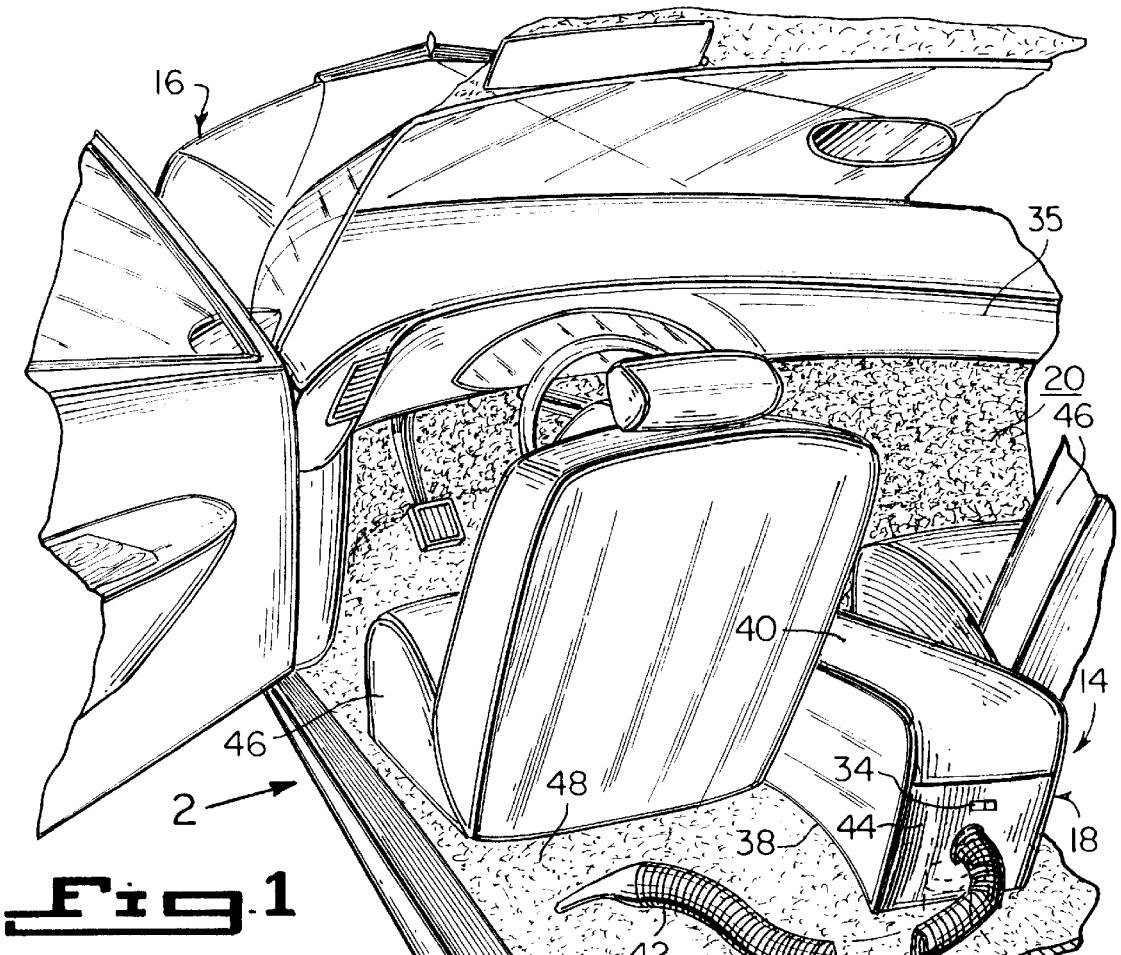
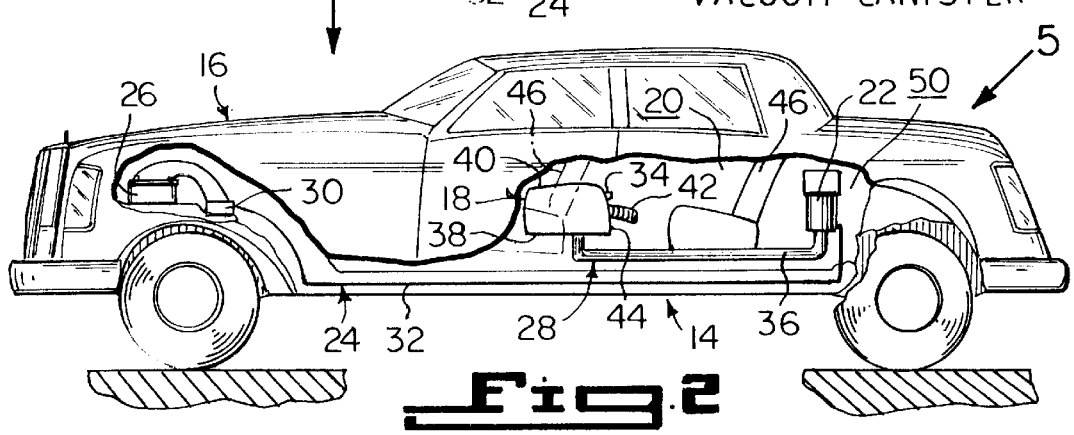

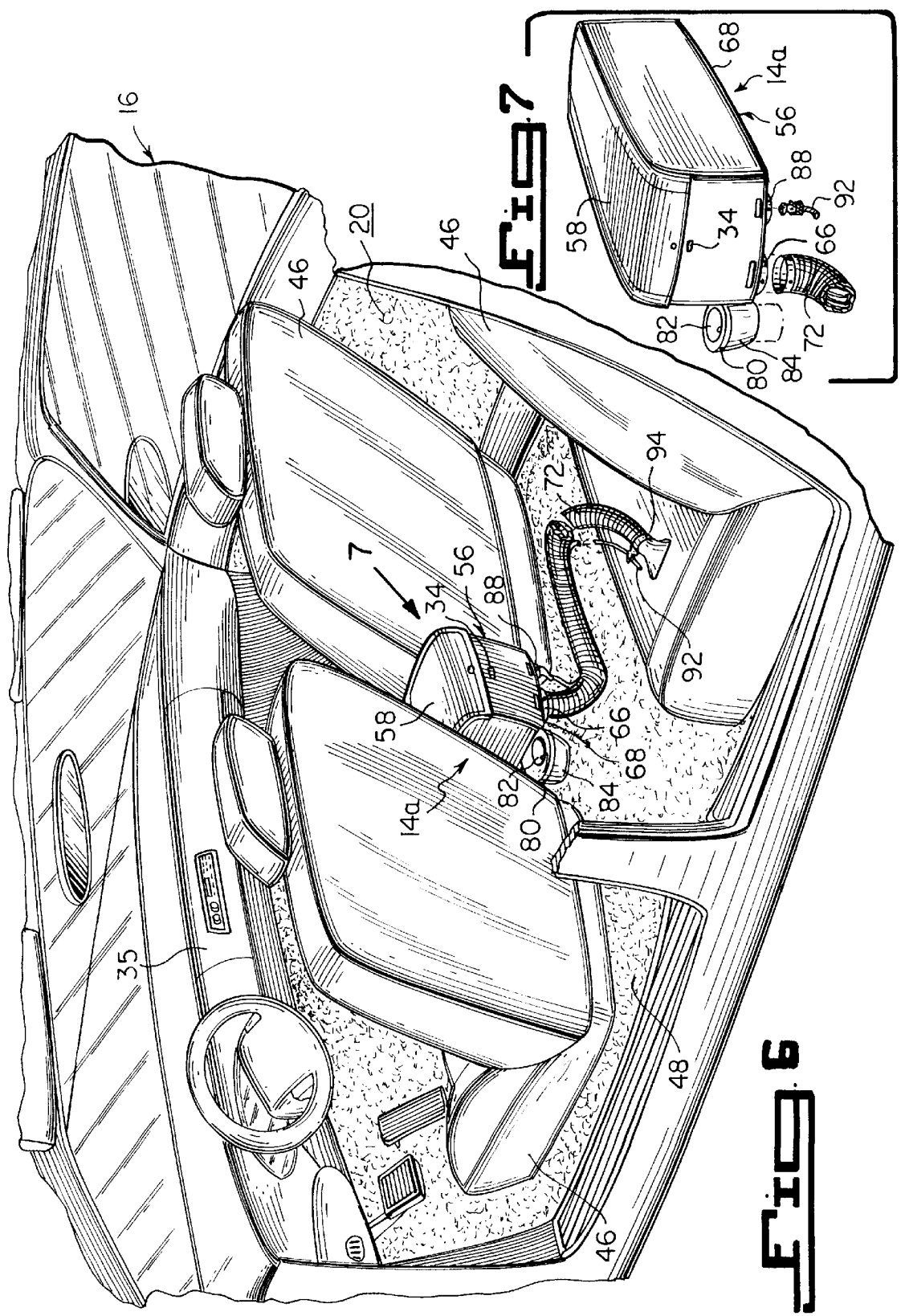

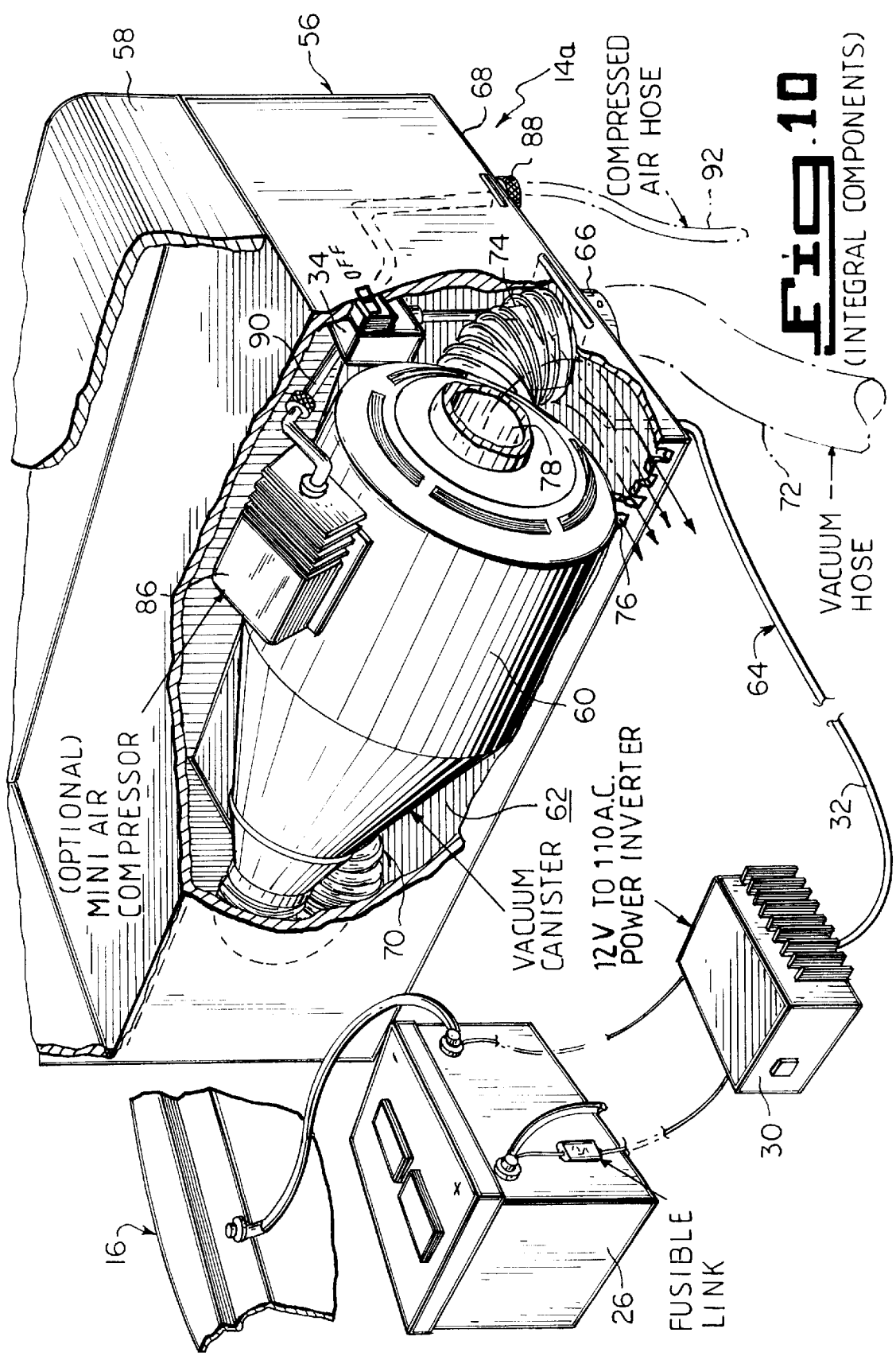

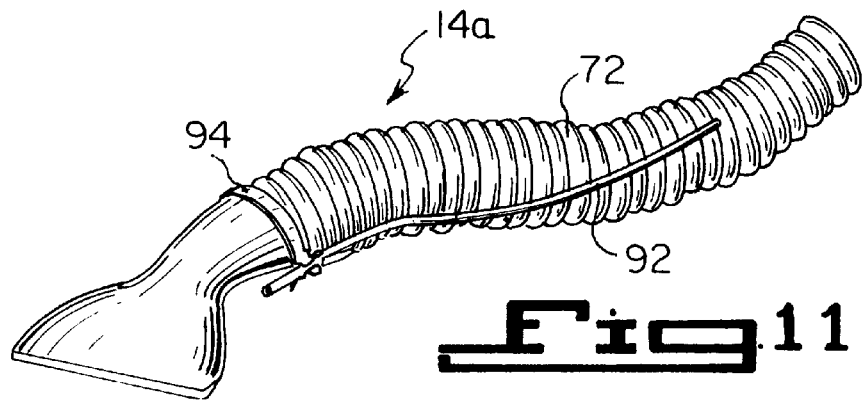
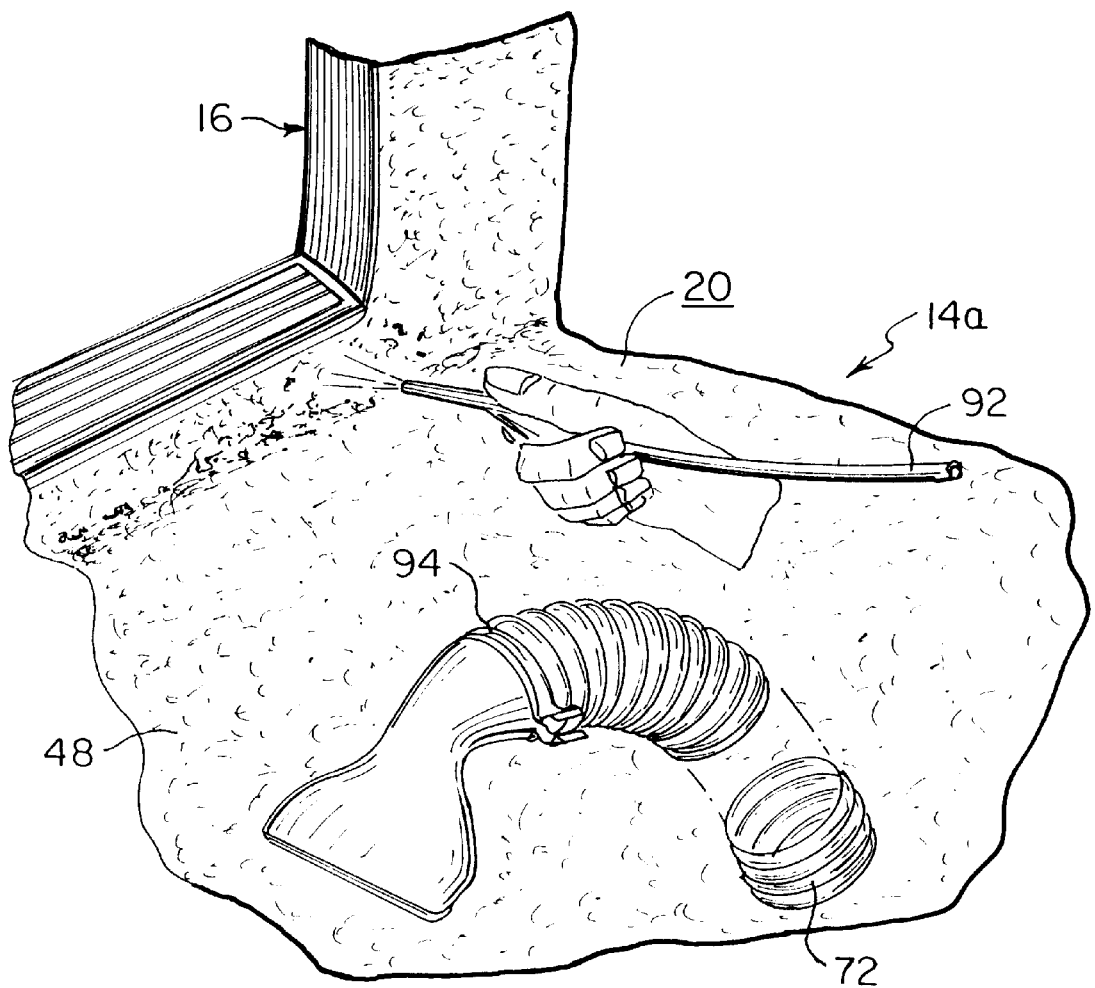
Fig. 12
(USE OF COMPRESSED AIR TO DISLODGE AND DISPERSE LITTER FROM CORNERS FOR VACUUM)

VACUUM SYSTEM FOR A MOTOR VEHICLE

BACKGROUND OF THE INVENTION

1. Field of the Invention

The instant invention relates generally to trash collection devices and more specifically it relates to a vacuum system for a motor vehicle. The vacuum system for a motor vehicle contains a vacuum actuated litter box within the interior compartment of the motor vehicle, that will extract any litter deposited therein. A flexible vacuum hose can be coupled to the vacuum actuated litter box to clean the carpet and seats within the interior compartment of the motor vehicle. An auxiliary flexible vacuum hose can also be coupled to a vacuum canister of the vacuum system located within the trunk compartment of the motor vehicle to clean the carpet within the trunk compartment.

2. Description of the Prior Art

Numerous trash collection devices have been provided in prior art. For example, U.S. Pat. No. 3,449,787 to Rothstein et al.; U.S. Pat. No. 3,998,385 to Ogle; U.S. Pat. No 4,072,097 to Seibel and U.S. Pat. No. 4,453,286 to Wieland all are illustrative of such prior art. While these units may be suitable for the particular purpose to which they address, they would not be as suitable for the purposes of the present invention as heretofore described.

ROTHSTEIN, MORRIS L.

ROTHSTEIN, HOWARD B.

CENTRAL VACUUM CLEANING SYSTEM FOR VEHICLES

U.S. Pat. No. 3,449,787

A central vacuum cleaning system for use in a vehicle which is entirely self-contained and portable, and powered by the battery of the vehicle. A convenience coupling is provided within the vehicle to receive a flexible vacuum hose for cleaning the interior of the vehicle while either stationary or in motion. The cleaning unit includes a solenoid, connected to the vehicle's battery and the cleaning unit, and electrically responsive to the insertion of the cleaning hose into the convenience outlet.

OGLE, DAVID W.

AUTOMOBILE LITTER EVACUATION SYSTEM

U.S. Pat. No. 3,998,385

A litter removal or evacuation apparatus for installation in a vehicle such as an automobile, truck, pleasure water craft, etc. There is a main litter removal system for larger articles such as bottles, napkins, etc. and an ash tray removal system to evacuate cigarette butts, cigar butts, etc., from the vehicle ash tray. In each of these two systems, there is a litter receptacle to receive the litter, a removal tube leading from the vehicle passenger compartment to the receptacle, and a suction tube leading from its related receptacle to the intake housing of the conventional heating and ventilating system of the vehicle. A suction adequate to draw litter through the removal tubes into the litter receptacles is created through the blower system of the vehicle heating and ventilating system, by simultaneously closing off the intake vent through which ambient air is normally drawn into the heating and ventilating system, and also operating the blower. In a second embodiment an elongate removal tube also acts as a receptacle for the litter.

SEIBEL, ARTHUR H.

LITTER DISPOSAL DEVICE FOR AUTOMOBILES

U.S. Pat. No. 4,072,097

There is disclosed an improved litter disposal device for use on vehicles including automobiles. The litter disposal device permits the occupants of the automobile or other vehicle to dispose of litter through access ports in the interior of the passenger compartment of the automobile or other vehicle. The interior access ports open into a litter conduit conveyor system mounted along the under carriage of the automobile. Once the litter is deposited into the conduit, it is conveyed through the conduit by the operation of a wiper plug in the conveyor which is electromechanically movable from the forward end of the conveyor to the open rearward end of the conveyor. The litter is deposited into an accumulation receptacle which is positioned, typically, within the trunk compartment of the automobile. The accumulation receptacle is provided with an access door for easy removal of the litter when the receptacle is full. Further, the receptacle is provided with an electrically or hydraulically actuated compressor which compacts the litter.

WIELAND, CLARENCE W.

VACUUM INDUCED TRASH COLLECTION SYSTEM

U.S. Pat. No. 4,453,286

A trash collection system for use on vehicles includes a main receptacle having an interior in which a partial vacuum is induced by a vacuum pump. A vacuum line network is connected to the main receptacle and includes one or more main collection lines extending along the rows of seats and feeder lines extending up between the individual seats. The upper ends of the feeder line are open allowing passengers to dispose of trash into the feeder line after first opening the spring-loaded lid. A liquid dispenser dispenses water into the main collection line to extinguish any lit material which may be disposed of into the system.

SUMMARY OF THE INVENTION

Thousands of people today live in apartments and condos. Either their parking facilities have no electrical outlets or they are too lazy to carry their home vacuum to their car. The smaller portable vacuums that are sold in stores (battery powered) are not usually powerful enough to pick up the dirt and doesn't last that long. The only other alternative that they have, is to use a pay vacuum system at the service station.

The litter box isn't to accommodate large pieces such as plate lunches, soda cans, etc. The majority of people don't usually discard these type of trash from their moving cars. It is the smaller items that litter our streets and highways. Tissue, candy and gum wrappers, cigarette butts (from the ash trays), crumbs, store receipts, and hundreds of small items that people somehow feel that it's the natural thing to discard.

The built in vacuum has the power as a home vacuum and can be converted into a wet and dry system. Larger vehicles such as vans, will have more vacuum outlets built-in. There will also be an outlet in the trunk of the vehicles. The cost is low and affordable. The hose, vacuum lines, and vacuum will cost you no more than $40.00 (over the counter prices). Automotive engineers would be able to eliminate the power converter if they can provide the necessary power through their present system. (They would save the cost of the power converter.)

The built-in system will allow people to vacuum their cars with convenience and at any time. People with health problems from dust and pollen will appreciate having such a convenient system available without hassle (also parents with kids). With the announcement of such a built-in Vacuum system, Environmental and Health Organizations through the world will support and praise the undertaking (AWARDS).

A primary object of the present invention is to provide a vacuum system for a motor vehicle that will overcome the shortcomings of the prior art devices.

Another object is to provide a vacuum system for a motor vehicle that contains a vacuum actuated litter box within the interior compartment of the motor vehicle, which will extract any litter deposited within the litter box.

An additional object is to provide a vacuum system for a motor vehicle in which a flexible vacuum hose can be connected to the vacuum actuated litter box, so that the flexible vacuum hose can clean the interior compartment of the motor vehicle.

A further object is to provide a vacuum system for a motor vehicle that is simple and easy to use.

A still further object is to provide a vacuum system for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view broken away and in section, showing the interior compartment of a motor vehicle with a portion of a first embodiment of the instant invention installed therein.

FIG. 2 is a side view taken generally in the direction of arrow 2 in FIG. 1, with parts of the motor vehicle broken away, showing the first embodiment therein.

FIG. 6 is a perspective view broken away and in section, showing the interior compartment of a motor vehicle with a second embodiment of the instant invention installed therein.

FIG. 7 is a partly exploded perspective view of the second embodiment taken in the direction of arrow 7 in FIG. 6.

FIG. 10 is an enlarged perspective view of the second embodiment with parts broken away, in section and in phantom, showing the various integral components thereof.

FIG. 11 is an enlarged perspective view of a portion of the flexible vacuum hose, showing a portion of the compressed air hose connected thereto with a clip.

FIG. 12 is an enlarged perspective view of a portion of the interior compartment of the motor vehicle, showing the compressed air hose removed from the clip, dislodging and dispersing litter from the corners thereof.

Similar reference characters denote corresponding features consistently throughout the attached drawings.

DESCRIPTION OF THE PREFERRED EMBODIMENTS

Figure 3:
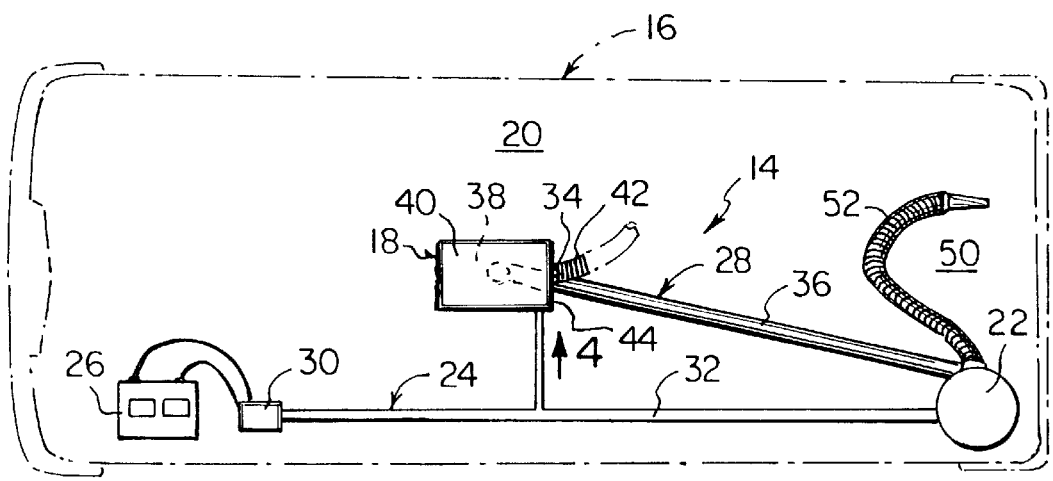
FIG. 3 is a diagrammatic top view taken in the direction of arrow 3 in FIG. 2, showing the motor vehicle in phantom.
Figure 4:
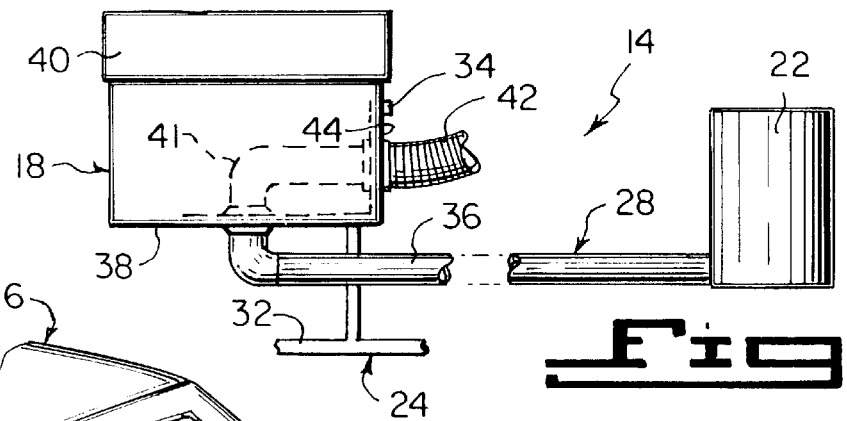
FIG. 4 is a side view of a portion of the first embodiment taken in the direction of arrow 4 in FIG. 3.
Figure 5:
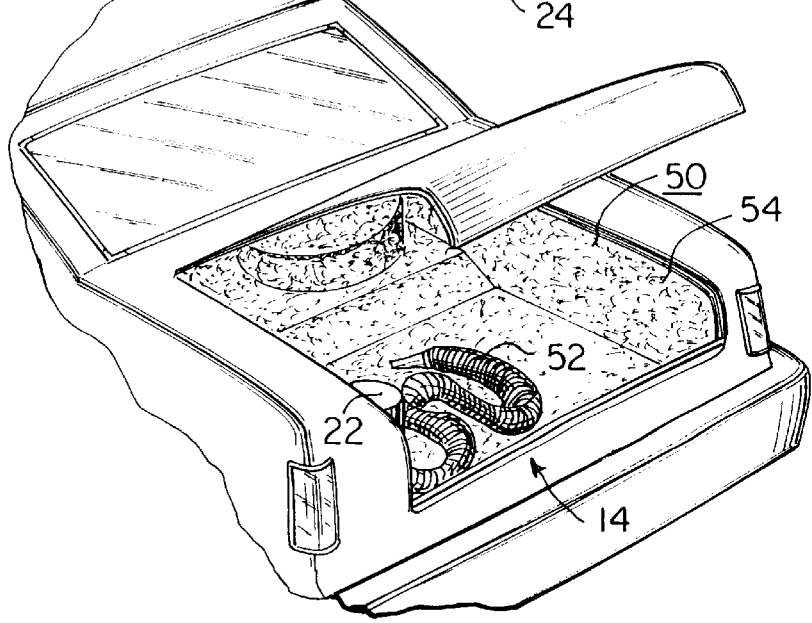
FIG. 5 is a perspective view taken in the direction of arrow 5 in FIG. 2, with the trunk compartment open and parts of the motor vehicle broken away, showing the vacuum canister and auxiliary flexible vacuum hose of the first embodiment therein.
Figure 8:
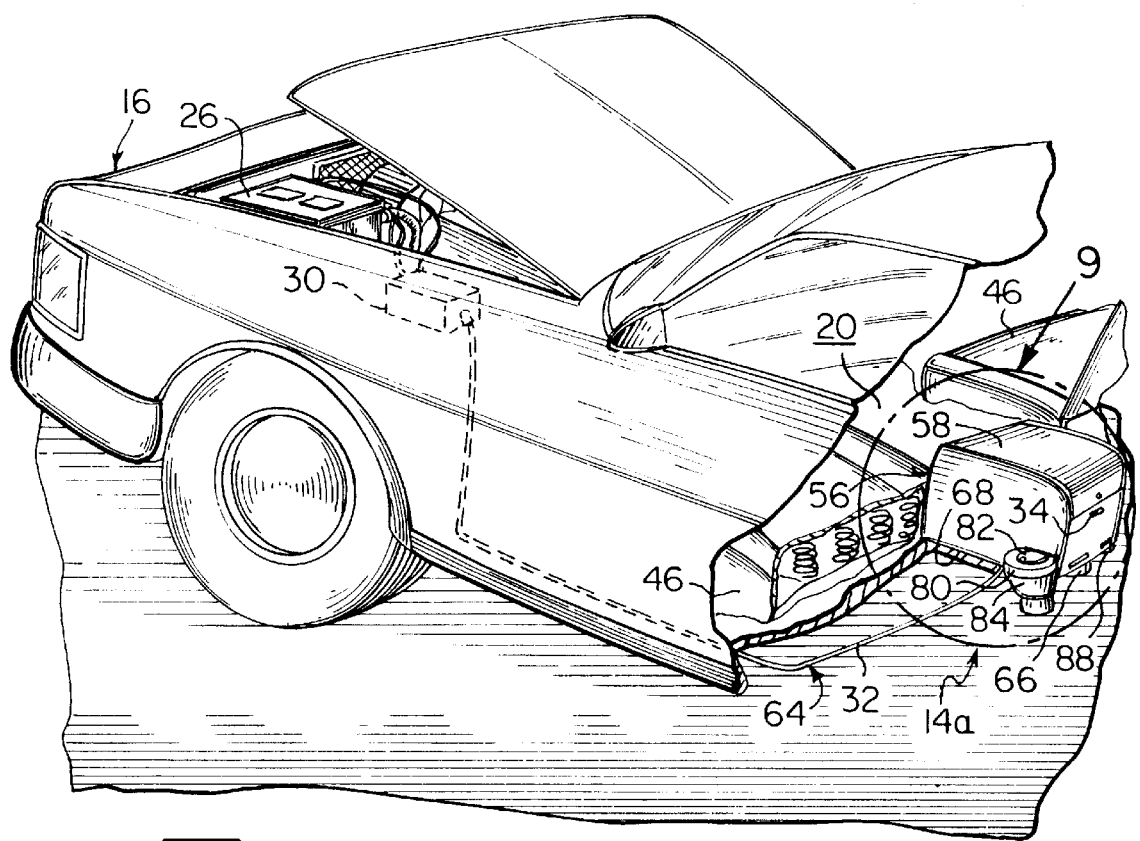
FIG. 8 is a perspective view of the motor vehicle with parts broken away and in section, showing the electrical connection of the second embodiment.
Figure 9:
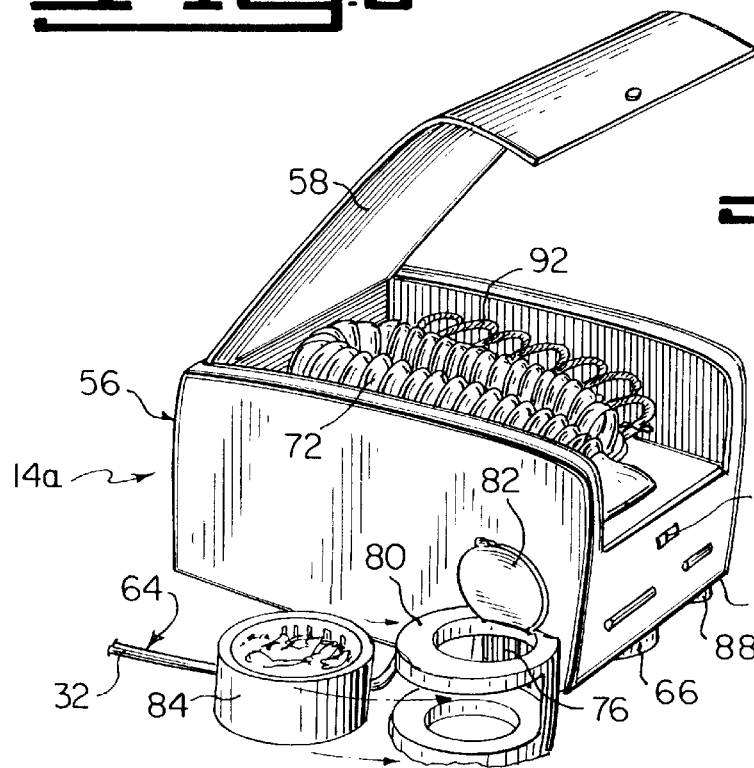
FIG. 9 is an enlarged perspective view as indicated by arrow 9 in FIG. 8, showing the top cover of the litter box open, with the flexible vacuum hose and compressed air hose stored therein and the litter receptacle removed from the holder.

Turning now descriptively to the drawings, in which similar reference characters denote similar elements throughout the several views, FIGS. 1 through 12 illustrate the present invention which are vacuum systems 14 and 14a, for a motor vehicle 16. With regard to the reference numerals used, the following numbering is used throughout the various drawing figures.

14 vacuum system
14a modified vacuum system
16 motor vehicle
18 litter box of 14
20 interior compartment of 16
22 vacuum canister of 16
24 electrically connecting facility of 14
26 battery in 16
28 fluidly coupling component of 14
30 power converter of 24
32 elongate electric wire of 24
34 on/off switch of 24
35 dashboard of 16
36 vacuum conduit line for 28
38 bottom wall of 18
40 top cover of 18
41 first flexible vacuum hose of 14
42 second flexible vacuum hose of 14
44 rear wall of 18
46 seat in 20
48 carpet in 20
50 trunk compartment of 16
52 auxiliary flexible vacuum hose of 14
54 carpet in 50
56 litter box of 14a 58 top cover on 56
60 vacuum canister of 14a in 62
62 bottom compartment of 56
64 electrically connecting facility of 14a
66 vacuum hose connector on 68
68 bottom wall of 56
70 fluidly coupling component of 14a
72 flexible vacuum hose of 14a
74 flexible vacuum hose for 70
76 vacuum exhaust vent in 56
78 outlet port of 60
80 holder on 56
82 spring loaded lid on 80
84 removable litter receptacle in 80
86 mini air compressor of 14a
88 compressed air hose connector on 68
90 pipe between 86 and 88
92 flexible compressed air hose of 14a
94 clip on 72

The vacuum system 14 for the motor vehicle 16 in FIGS. 1 through 5, comprises a litter box 18 mounted in any convenient location within an interior compartment 20 of the motor vehicle 16. A vacuum canister 22 is provided that holds trash in disposable vacuum bags to be disposed at a later date. A facility 24 is for electrically connecting the vacuum canister 22 to a battery 26 in the motor vehicle 16, to operate the vacuum canister 22. A component 28 is for fluidly coupling the vacuum canister 22 to the litter box 18, so that any litter deposited within the litter box 18 will be drawn through the fluidly coupling component 28 and deposited into the vacuum canister 22, to be disposed of at a later date. A disposable vacuum bag (not shown) is located within the vacuum canister 22. When the vacuum bag becomes full, it can be removed from the vacuum canister 22 and replaced with a new one.

The electrically connecting facility 24 includes a power converter 30 connected to the battery 26, to convert twelve volts from the battery 26 into one hundred and ten alternating current volts. An elongate electric wire 32 extends between the power converter 30 and the vacuum canister 22. An on/off switch 34 is electrically connected to the elongate electric wire 32, to turn the vacuum canister 22 on and off. The on/off switch 34 is shown mounted on the litter box 18, but it also can be mounted on the dashboard 35 or other locations within the interior compartment 20 of the motor vehicle 16. The fluidly coupling component 28 is a vacuum conduit line 36 extending centrally between bottom wall 38 of the litter box 18 and the vacuum canister 22. If the vacuum canister 22 is powered directly from the engine of the motor vehicle 16, the power converter 30 can be eliminated.

A top cover 40 is hinged to the litter box 18. A first flexible vacuum hose 41 is coupled inside, between the bottom wall 38 and a rear wall 4 of the litter box 18. A second flexible vacuum hose 42 can be coupled to the rear wall 44 of the litter box 18. When the top cover 40 is closed on the litter box 18, the second flexible vacuum hose 42 can be used to clean seats 46 and carpet 48 within the interior compartment 20 of the motor vehicle 16.

The vacuum canister 22 is mounted within a trunk compartment 50 of the motor vehicle 16. An auxiliary flexible vacuum hose 52 is coupled to the vacuum canister 22. The auxiliary flexible vacuum hose 52 can be used to clean carpet 54 within the trunk compartment 50 of the motor vehicle 16.

A modified vacuum system 14a for the motor vehicle 16 as shown in FIGS. 6 through 12, consists of a litter box 56 mounted in any convenient location within an interior compartment 20 of the motor vehicle 16, so that litter can be deposited within the litter box 56. A top cover 58 is hinged to the litter box 56. A vacuum canister 60 is stored within a bottom compartment 62 within the litter box 56. A facility 64 is for electrically connecting the vacuum canister 60 to the battery 26 in the motor vehicle 16, to operate the vacuum canister 60. A vacuum hose connector 66 is on a bottom wall 68 of the litter box 56. A component 70 is for fluidly coupling the vacuum canister 60 to unlimited vacuum hose connectors 66 located in any convenient location within the interior compartment 20 of the motor vehicle 16. A flexible vacuum hose 72 is coupled in a detachable manner to the vacuum hose connector 66. The flexible vacuum hose 72 can be used to clean the seats 46 and carpet 48 within the interior compartment 20 of the motor vehicle 16. The flexible vacuum hose 72 can be stored within the litter box 56 when not in use.

The electrically connecting facility 64 is identical to the electrically connecting facility 24 for the vacuum system 14, and consists of the power converter 30 connected to the battery 26 to convert twelve volts from the battery 26 into one hundred and ten alternating current volts. The elongate electric wire 32 extends between the power converter 30 and the vacuum canister 60. The on/off switch 34 is electrically connected to the elongate electric wire 32, to turn the vacuum canister 60 on and off. Any split system of the vacuum canister 60 and any other way to get power to the vacuum canister 60, other than the power converter 30 can also be utilized. The fluidly coupling component 70 is a flexible vacuum hose 74. If the vacuum canister 60 is powered directly from the engine of the motor vehicle 16, the power converter 30 can be eliminated.

The litter box 56 has a vacuum exhaust vent 76 located adjacent an outlet port 78 of the vacuum canister 60. A holder 80 is mounted to the litter box 56 at the vacuum exhaust vent 76. A spring loaded lid 82 is hinged on the holder 80. A removable litter receptacle 84 is carried within the holder 80, to receive litter from the vacuum canister 60, which can be disposed of at a later date.

A mini air compressor 86 can be stored within the bottom compartment 62 of the litter box 56. A compressed air hose connector 88 is on the bottom wall 68 of the litter box 56. A pipe 90 extends between the mini air compressor 86 and the compressed air hose connector 88. A flexible compressed air hose 92 is coupled in a detachable manner to the compressed air hose connector 88. The flexible compressed air hose 92 can be used to dislodge and disperse litter from the corners within the interior compartment 20 of the motor vehicle 16. The flexible compressed air hose 92 can be stored within the litter box 56 when not in use. A clip 94 is attached onto a distal end of the flexible vacuum hose 72. The clip 94 will retain the flexible compressed air hose 92 thereto when not in use. The vacuum systems 14 and 14a can also be used as a wet and dry system.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vacuum system for a motor vehicle comprising:
    a) a litter box mounted in any convenient location within an interior compartment of the motor vehicle;
    b) a vacuum canister that holds trash in disposable vacuum bags to be disposed at a later date;
    c) means for electrically connecting said vacuum canister to a battery in the motor vehicle to operate said vacuum canister;
    d) means for fluidly coupling said vacuum canister to said litter box, so that any litter deposited within said litter box will be drawn through said fluidly coupling means and deposited into said vacuum canister to be disposed of at a later date; and
    e) said electrically connecting means includes a power converter connected to the battery to convert twelve volts from the battery into one hundred and ten alternating current volts, an elongate electric wire extending between said power converter and said vacuum canister, and an on/off switch electrically connected to said elongate electric wire to turn said vacuum canister on and off.

2. A vacuum system for a motor vehicle as recited in claim 1, wherein said fluidly coupling means is a vacuum conduit line extending centrally between a bottom wall of said litter box and said vacuum canister.

3. A vacuum system for a motor vehicle as recited in claim 1, further including:
    a) said vacuum canister mounted within a trunk compartment of the motor vehicle; and
    b) an auxiliary flexible vacuum hose coupled to said vacuum canister, so that said auxiliary flexible vacuum hose can be used to clean carpet within the trunk compartment of the motor vehicle.

4. A vacuum system for a motor vehicle comprising:
    a) a litter box mounted in any convenient location within an interior compartment of the motor vehicle;
    b) a vacuum canister that holds trash in disposable vacuum bags to be disposed at a later date;
    c) means for electrically connecting said vacuum canister to a battery in the motor vehicle, to operate said vacuum canister, wherein said electrically connecting means includes a power converter connected to the battery to convert twelve volts from the battery into one hundred and ten alternating current volts, an elongate electric wire extending between said power converter and said vacuum canister and an on/off switch electrically connected to said elongate electric wire to turn said vacuum canister on and off; and
    d) means for fluidly coupling said vacuum canister to said litter box, so that any litter deposited within said litter box will be drawn through said fluidly coupling means and deposited into said vacuum canister to be disposed of at a later date.

5. A vacuum system for a motor vehicle as recited in claim 4, wherein said fluidly coupling means is a vacuum conduit line extending centrally between a bottom wall of said litter box and said vacuum canister.

6. A vacuum system for a motor vehicle as recited in claim 5, further including:
    a) a top cover hinged to said litter box;
    b) a first flexible vacuum hose coupled inside between a bottom wall and a rear wall of said litter box; and
    b) a second flexible vacuum hose coupled to said rear wall of said litter box, so that when said top cover is closed on said litter box, said second flexible vacuum hose can be used to clean seats and carpet within the interior compartment of the motor vehicle.

7. A vacuum system for a motor vehicle as recited in claim 6, further including:
    a) said vacuum canister mounted within a trunk compartment of the motor vehicle; and
    b) an auxiliary flexible vacuum hose coupled to said vacuum canister, so that said auxiliary flexible vacuum hose can be used to clean carpet within the trunk compartment of the motor vehicle.

8. A vacuum system for a motor vehicle comprising:
    a) a litter box mounted in any convenient location within an interior compartment of the motor vehicle;
    b) a vacuum canister that holds trash in disposable vacuum bags to be disposed at a later date;
    c) means for electrically connecting said vacuum canister to a battery in the motor vehicle to operate said vacuum canister;
    d) means for fluidly coupling said vacuum canister to said litter box, so that any litter deposited within said litter box will be drawn through said fluidly coupling means and deposited into said vacuum canister to be disposed of at a later date;
    e) a top cover hinged to said litter box;
    f) a first flexible vacuum hose coupled inside between a bottom wall and a rear wall of said litter box; and
    g) a second flexible vacuum hose coupled to said rear wall of said litter box, so that when said top cover is closed on said litter box, said second flexible vacuum hose can be used to clean seats and carpet within the interior compartment of the motor vehicle.

* * * * *